United States Patent
Baba et al.

(10) Patent No.: US 9,606,227 B2
(45) Date of Patent: Mar. 28, 2017

(54) ULTRASONIC TRANSMISSION/RECEPTION CONDITION OPTIMIZATION METHOD, ULTRASONIC TRANSMISSION/RECEPTION CONDITION OPTIMIZATION PROGRAM, AND ULTRASONIC DIAGNOSTIC APPARATUS

(75) Inventors: Tatsuro Baba, Otawara (JP); Takuya Sasaki, Nasu-gun (JP); Satoru Tezuka, Nasushiobara (JP); Yasuo Miyajima, Utsunomiya (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 1333 days.

(21) Appl. No.: 11/424,375

(22) Filed: Jun. 15, 2006

(65) Prior Publication Data
US 2007/0016048 A1    Jan. 18, 2007

(30) Foreign Application Priority Data

Jun. 16, 2005  (JP) ................................. 2005-176488

(51) Int. Cl.
*A61B 8/00*    (2006.01)
*G01S 15/89*    (2006.01)
(Continued)

(52) U.S. Cl.
CPC ........ *G01S 15/8925* (2013.01); *G10K 11/346* (2013.01); *G01S 7/5205* (2013.01); *G01S 7/52047* (2013.01)

(58) Field of Classification Search
CPC ............... G10K 11/346; G01S 15/8925; G01S 7/52047; G01S 7/5205
See application file for complete search history.

(56) References Cited

U.S. PATENT DOCUMENTS 4,694,700 A *  9/1987  Maerfeld ......................... 73/628
4,841,492 A *  6/1989  Russell ......................... 367/105
(Continued)

FOREIGN PATENT DOCUMENTS

DE    103 36 101 A1    4/2004
JP    5-31109    2/1993
(Continued)

OTHER PUBLICATIONS

A. Erhard, et al., "Calculation and construction of phased array-UT probes", Nuclear Engineering and Design, XP002381240, vol. 94, 1986, pp. 375-385.
(Continued)

*Primary Examiner* — Long V Le
*Assistant Examiner* — Colin T Sakamoto
(74) *Attorney, Agent, or Firm* — Oblon, McClelland, Maier & Neustadt, L.L.P.

(57) ABSTRACT

A spatial position x' of each ultrasonic transducer is accurately obtained for each probe in consideration of each edge transducer gap, and a delay time $T(x'(n))$ and a weighting coefficient $W(x'(n))$ are calculated on the basis of the position of each ultrasonic transducer. A control unit executes ultrasonic transmission/reception by using the calculated delay times and weighting coefficients to realize a suitable acoustic field with high deflection angle accuracy, small sidelobes, and the like as compared with the prior art.

17 Claims, 7 Drawing Sheets

(51) Int. Cl.
*G10K 11/34* (2006.01)
*G01S 7/52* (2006.01)

(56) References Cited

U.S. PATENT DOCUMENTS

| | | | | |
|---|---|---|---|---|
| 4,893,284 | A | * | 1/1990 | Magrane ............................ 367/12 |
| 5,182,485 | A | * | 1/1993 | de la Fonteijne ............. 310/334 |
| 5,203,336 | A | * | 4/1993 | Iida et al. ...................... 600/463 |
| 5,379,769 | A | | 1/1995 | Ito et al. |
| 5,676,149 | A | * | 10/1997 | Yao ............................... 600/437 |
| 5,840,033 | A | | 11/1998 | Takeuchi |
| 5,920,523 | A | | 7/1999 | Hanafy et al. |
| 5,957,850 | A | * | 9/1999 | Marian, Jr. .............. A61B 8/12 29/25.35 |
| 5,986,972 | A | * | 11/1999 | Li .................................... 367/13 |
| 6,120,449 | A | * | 9/2000 | Snyder et al. ................. 600/447 |
| 6,135,960 | A | * | 10/2000 | Holmberg ..................... 600/447 |
| 6,305,225 | B1 | * | 10/2001 | Bae et al. ....................... 73/602 |
| 6,424,597 | B1 | * | 7/2002 | Bolomey et al. ............. 367/138 |
| 7,207,940 | B2 | * | 4/2007 | Satoh ............................ 600/437 |
| 2001/0015592 | A1 | | 8/2001 | Sliwa, Jr. et al. |

FOREIGN PATENT DOCUMENTS

| | | |
|---|---|---|
| JP | 6-169921 | 6/1994 |
| JP | 9-313487 | 12/1997 |
| JP | 2000-125395 | 4/2000 |
| JP | 2005-74146 | 3/2005 |
| JP | 2007-21192 | 2/2007 |

OTHER PUBLICATIONS

Japanese Office Action issued Jul. 17, 2012, in Patent Application No. 2006-166016 (with English-language translation).

Office Action mailed Nov. 12, 2013, in Japanese Patent Application No. 2012-204910 (with English Translation).

\* cited by examiner

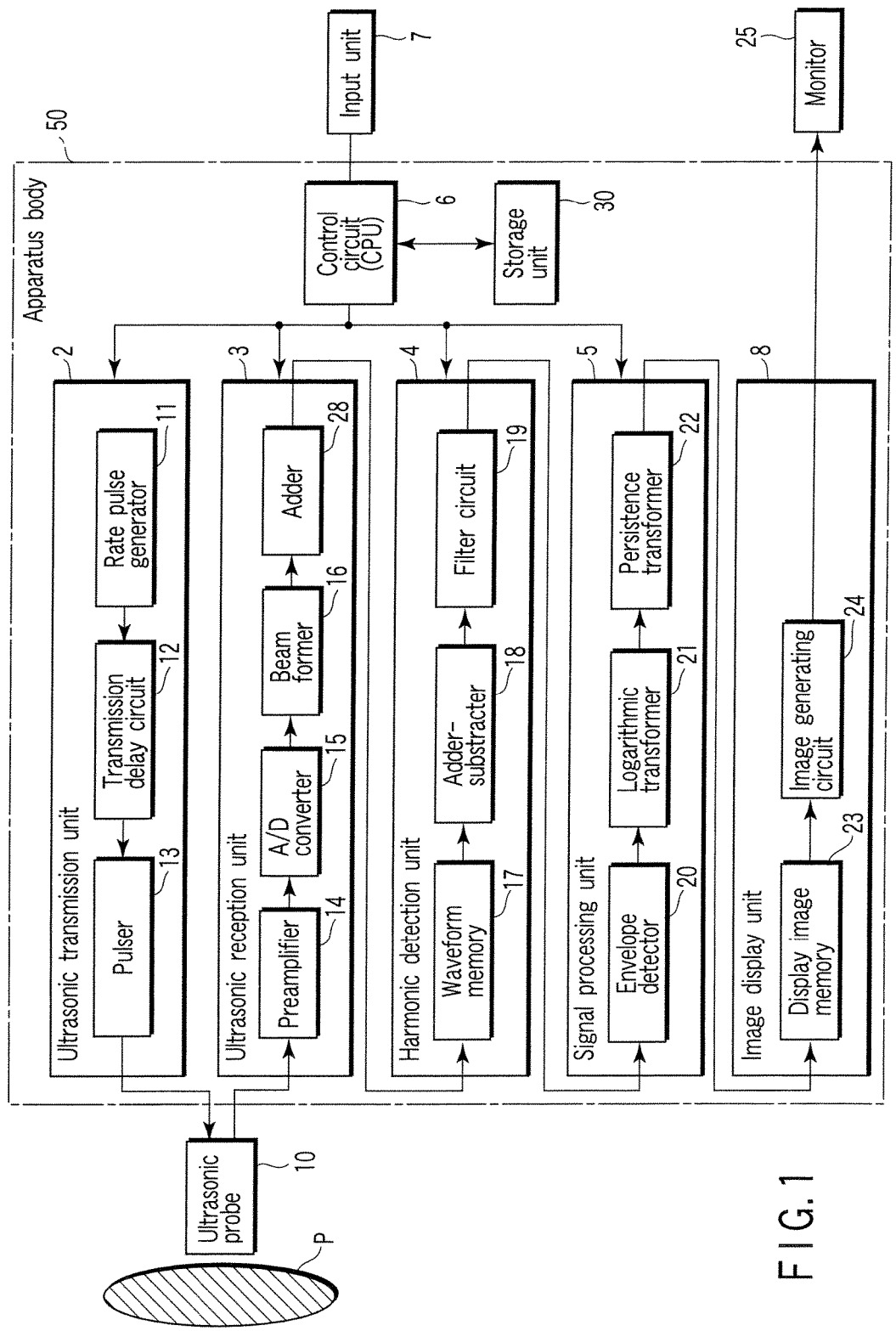
F I G. 1

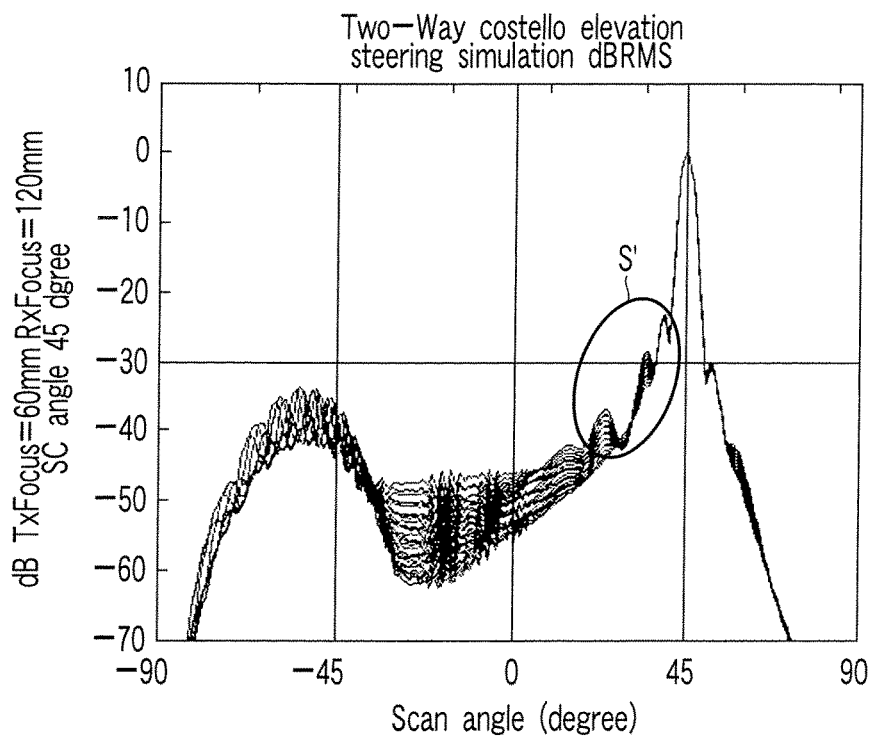
F I G. 9
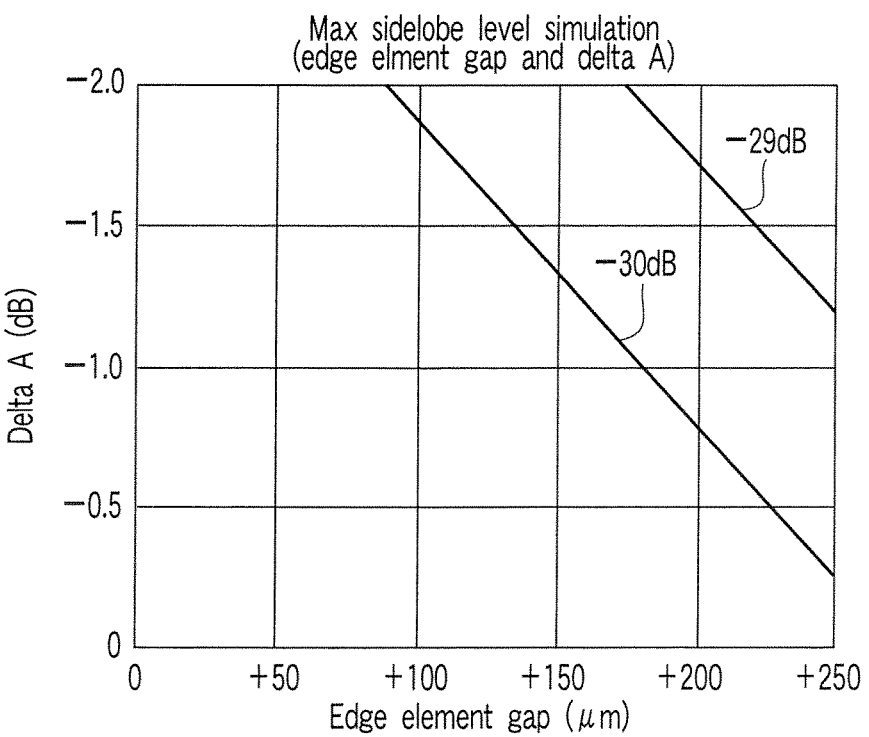
F I G. 10

ULTRASONIC TRANSMISSION/RECEPTION CONDITION OPTIMIZATION METHOD, ULTRASONIC TRANSMISSION/RECEPTION CONDITION OPTIMIZATION PROGRAM, AND ULTRASONIC DIAGNOSTIC APPARATUS

CROSS-REFERENCE TO RELATED APPLICATIONS

This application is based upon and claims the benefit of priority from prior Japanese Patent Application No. 2005-176488, filed Jun. 16, 2005, the entire contents of which are incorporated herein by reference.

BACKGROUND OF THE INVENTION

1. Field of the Invention

The present invention relates to the optimization of beam deflection in ultrasonic transmission/reception using a two-dimensional ultrasonic probe having, for example, ultrasonic transducers arranged in a two-dimensional matrix, a delay time for beam convergence, a weighting coefficient used in echo signal addition processing, and the like.

2. Description of the Related Art

An ultrasonic diagnostic apparatus is a medical image device which noninvasively obtains a tomogram of a soft tissue in a living body from the body surface by an ultrasonic pulse reflection method. This ultrasonic diagnostic apparatus has advantages of being smaller in size, more inexpensive, and safer because of no exposure to X-rays and the like than other medical image devices, and of being capable of blood flow imaging, and hence is widely used in a cardiac department, abdominal department, urological department, obstetrics and gynecology, and the like.

In recent ultrasonic imaging apparatuses, a real-time three-dimensional display function (three-dimensional real-time display function) has been put into practice. Techniques for this function include a technique (mechanical 4D scanning method) of using a mechanical 3D scanner which scans a three-dimensional area of a subject by mechanically scanning an electronic scanning type one-dimensional array transducer in a direction perpendicular to a scanning surface and a technique (to be referred to as a real-time 3D scanning method hereinafter) of realizing scanning on a three-dimensional area of a subject by electronic scanning operation using a two-dimensional ultrasonic probe having a two-dimensional array of transducers (see, for example, Jpn. Pat. Appln. KOKAI Publication Nos. 6-169921 and 9-313487).

The real-time 3D scanning method, in particular, has been rapidly popularized together with the introduction of a two-dimensional ultrasonic probe. As shown in FIG. 11, a two-dimensional ultrasonic probe used in this real-time 3D scanning method, which has ultrasonic transducers arranged in a two-dimensional matrix (e.g., 36 elements×48 elements=1728 elements), is formed by cutting a plurality of (e.g., three) blocks made of a ceramic piezoelectric material or the like (into 12 elements×48 elements each) so as to form ultrasonic transducer blocks BL having a plurality of ultrasonic transducers, and bonding the blocks BL to each other through adhesive layers as shown in FIG. 12. Note that a plurality of ultrasonic transducer blocks BL are bonded to each other through adhesive layers in this manner because it is difficult to cut one ceramic piezoelectric material block into, for example, 1782 elements by using any one of the current dicing techniques.

For example, the following problems arise in the conventional ultrasonic diagnostic apparatuses.

FIG. 13 is an enlarged view of the inside of the circle shown in FIG. 12, which shows an edge of each ultrasonic transducer block on the ultrasonic wave application side. As has been described above, the respective ultrasonic transducer blocks are bonded to each other through adhesive layers (not shown). As shown in FIG. 13, therefore, the ultrasonic transducer at one or two ends of each ultrasonic transducer block (in FIG. 13, the 12th, 13th, 24th, and 25th ultrasonic transducers to be referred to as "edge ultrasonic transducers" hereinafter) are bonded to the adhesive layers. For this reason, each edge ultrasonic transducer is subjected to the influence of bonding (e.g., changes in shape and the like), and has vibration characteristics (i.e., acoustic characteristics) different from those of the other type (which is not used for bonding) of ultrasonic transducers. However, the conventional system gives no consideration of the characteristic difference between edge ultrasonic transducers and the other type of ultrasonic transducers due to this bonding.

In addition, there are gaps (edge transducer gaps) due to the presence of the adhesive layers between edges of the ultrasonic transducer blocks. However, calculation of delay times and the like in ultrasonic transmission/reception in the prior art gives no consideration to such edge transducer gaps. This may therefore be a factor that causes a corresponding error. For example, this causes a sidelobe S like that shown in FIG. 14.

BRIEF SUMMARY OF THE INVENTION

The present invention has been made in consideration of the above situation, and has as its object to provide an ultrasonic transmission/reception condition optimization method, ultrasonic transmission/reception condition optimization program, and ultrasonic diagnostic apparatus which can realize suitable acoustic characteristics as compared with the prior art by executing ultrasonic transmission/reception in consideration of edge transducer gaps and the characteristics of edge transducers.

According to an aspect of the present invention, there is provided an ultrasonic diagnostic apparatus comprising an ultrasonic probe including a plurality of ultrasonic transducer blocks which generate ultrasonic waves on the basis of supplied driving signals and generate echo signals on the basis of received ultrasonic waves, and each include a plurality of ultrasonic transducers, and an adhesive layer which bonds the plurality of ultrasonic transducer blocks to each other, a transmission/reception unit to transmit/receive ultrasonic waves, and a control unit which determines a transmission/reception condition in accordance with a position of each ultrasonic transducer block, and controls the transmission/reception unit on the basis of the determined transmission/reception condition.

According to another aspect of the present invention, there is provided an ultrasonic transmission/reception condition optimization method using an ultrasonic probe including a plurality of ultrasonic transducer blocks including a plurality of ultrasonic transducers which generate ultrasonic waves on the basis of supplied driving signals and generate echo signals on the basis of received ultrasonic waves, and an adhesive layer which bonds the plurality of ultrasonic transducer blocks to each other, comprising acquiring positions of the plurality of ultrasonic transducer blocks, determining a transmission/reception condition in accordance with the position of each ultrasonic transducer block, and executing ultrasonic transmission on the basis of the determined transmission/reception condition.

BRIEF DESCRIPTION OF THE SEVERAL VIEWS OF THE DRAWING

FIG. 1 is a block diagram showing the arrangement of an ultrasonic diagnostic apparatus 1 according to this embodiment;

FIG. 9 is a graph showing the spectrum distribution of echo signals obtained by ultrasonic transmission/reception using delay times and weighting coefficients determined by this delay time/weighting coefficient optimization function;

FIG. 10 is a graph showing the distribution of sidelobes which appear in ultrasonic transmission/reception using delay times and weighting coefficients determined by this delay time/weighting coefficient optimization function;

DETAILED DESCRIPTION OF THE INVENTION

Figure 2:
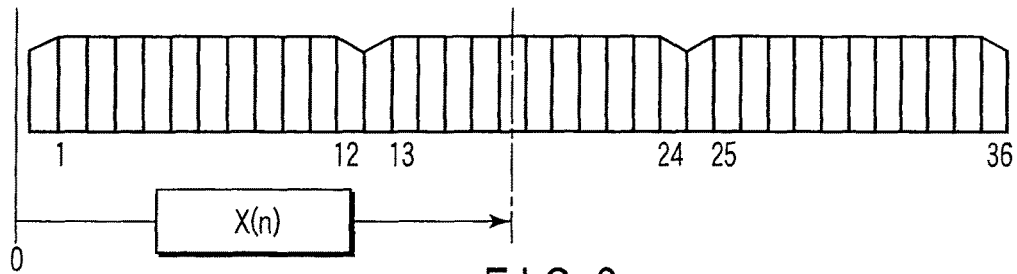
FIG. 2 is a view for explaining a delay time/weighting coefficient calculation technique in a conventional ultrasonic diagnostic apparatus.

An embodiment of the present invention will be described below with reference to the views of the accompanying drawing. Note that the same reference numerals denote constituent elements having substantially the same functions and arrangements, and a repetitive description will be made only when required.

FIG. 1 is a block diagram showing the arrangement of an ultrasonic diagnostic apparatus 1 according to this embodiment. As shown in FIG. 1, the ultrasonic diagnostic apparatus 1 comprises an ultrasonic probe 10, storage unit 30, input unit 7, monitor 25, and apparatus body 50.

The ultrasonic probe 10 includes a plurality of ultrasonic transducers which generate ultrasonic waves at a predetermined timing on the basis of a driving signal from an ultrasonic transmission unit 2 and convert reflected waves from a subject into electrical signals, matching layers provided for the ultrasonic transducers, backing members which prevent ultrasonic waves from propagating backward from the ultrasonic transducers, and the like. When ultrasonic waves are transmitted from the ultrasonic probe 10 to a subject P, the transmitted ultrasonic waves are sequentially reflected by a discontinuity surface of acoustic impedance of internal body tissue, and are received as an echo signal by the ultrasonic probe 10. The amplitude of this echo signal depends on an acoustic impedance difference on the discontinuity surface by which the echo signal is reflected. The echo produced when an ultrasonic pulse is reflected by the surface of a moving blood flow, cardiac wall, or the like is subjected to a frequency shift depending on the speed component of the moving body in the ultrasonic transmission direction due to a Doppler effect.

For the sake of a concrete description, assume that the ultrasonic probe 10 is a two-dimensional ultrasonic probe having ultrasonic transducers arranged in a two-dimensional matrix (e.g., 36 elements×48 elements=1728 elements). The ultrasonic probe 10 is formed as follows. For example, ultrasonic transducer blocks BL each having a plurality of ultrasonic transducers (e.g., 12 elements×48 elements) are formed by cutting a plurality of (e.g., three) blocks made of a ceramic piezoelectric material. These blocks are then bonded to each other in the array direction of ultrasonic transducers through adhesive layers.

The storage unit 30 stores images obtained by past imaging operation, images captured by this apparatus through a network and detachable storage media, a dedicated program for the execution of a predetermined imaging sequence, and the like.

The storage unit 30 also stores, for each probe, the spatial position of each ultrasonic transducer from a reference position set in consideration of an edge transducer gap and information (e.g., a predetermined formula or a correspondence table, which information will be referred to as "delay time/weighting coefficient acquisition information" hereinafter) for the acquisition of a delay time and weighting coefficient for each ultrasonic transducer on the basis of the spatial position of each ultrasonic transducer. In addition, the storage unit 30 stores, for each probe, a delay time and weighting coefficient for each ultrasonic transducer acquired on the basis of the spatial position of each ultrasonic transducer which is set in consideration of each edge transducer gap, as needed.

The input unit 7 includes various kinds of switches and buttons, a trackball, a mouse, a keyboard, and the like which are connected to the apparatus body 50 of the ultrasonic diagnostic apparatus 1 to input various kinds of instructions and conditions, an instruction to set a region of interest (ROI), various kinds of image quality condition setting instructions, and the like from the operator to the apparatus body. For example, when the operator operates a predetermined button of the input unit 7, delay time/weighting coefficient optimization processing (to be described later) or displaying of the result obtained by the processing in a predetermined form is executed.

The monitor 25 displays morphological information in the living body or blood flow information as an image on the basis of a video signal received from the apparatus body 50. The image or the like displayed on the monitor 25 is stored in a storage unit in the apparatus body 50 in response to predetermined operation with the input unit 7 or the like.

The apparatus body 50 comprises the ultrasonic transmission unit 2 which performs transmission control on ultrasonic waves transmitted from the ultrasonic probe 10, an ultrasonic reception unit 3 which performs preprocessing for an echo signal received by the ultrasonic probe 10, a harmonic detection unit 4 which detects a harmonic component from the echo signal having undergone the preprocessing, a signal processing unit 5 which generates image data upon performing predetermined signal processing for the detected harmonic component, an image display unit 8 which generates and displays an ultrasonic image on the basis of the image data, and a control circuit (CPU) 6.

The ultrasonic transmission unit 2 comprises a rate pulse generator 11, transmission delay circuit 12, and pulser 13. The rate pulse generator 11 generates a rate pulse which determines the cycle period (rate period) of ultrasonic pulses to be emitted into the subject, and supplies the rate pulse to the transmission delay circuit 12. The transmission delay circuit 12 comprises independent delay circuits of M channels equal in number to the ultrasonic transducers used for transmission. The transmission delay circuit 12 gives the received rate pulse a focusing delay time for focusing ultrasonic pulses to a predetermined depth and a deflection delay time for transmitting the ultrasonic pulses in a predetermined direction, and supplies the resultant rate pulse to the pulser 13. The pulser 13 includes independent driving circuits of the M channels equal in number to the delay circuits of the transmission delay circuit 12. The ultrasonic transducers mounted on the ultrasonic probe 10 are driven to emit ultrasonic pulses into the subject by applying driving signals generated by the respective driving circuits to the respective ultrasonic transducers.

Note that the transmission delay circuit 12 of the ultrasonic transmission unit 2 combines the focusing delay time and deflection delay time which are optimized by delay time/weighting coefficient optimization processing (to be described later) to give a delay time to the rate pulse.

The ultrasonic reception unit 3 comprises a preamplifier 14, A/D converter 15, beam former 16, and adder 28. The preamplifier 14 is designed to amplify small signals converted into electrical echo signals by the ultrasonic transducers to ensure a sufficient S/N ratio. The fundamental components and harmonic components of the echo signals amplified to a predetermined magnitude by the preamplifier 14 are converted into digital signals by the A/D converter 15, and the digital signals are sent to the beam former 16. The beam former 16 gives each echo signal converted into a digital signal a focusing delay time for focusing each reflected ultrasonic wave from a predetermined depth and a deflection delay time for scanning the subject while sequentially changing the reception directivity of each reflected ultrasonic wave. The adder 28 performs phased addition of the outputs from the beam former 16 (addition of the echo signals obtained from a predetermined direction upon phasing).

Note that the beam former 16 of the ultrasonic reception unit 3 performs beam forming by using at least one of the focusing delay time and the deflection delay time which are optimized by delay time/weighting coefficient optimization processing (to be described later). The adder 28 of the ultrasonic reception unit 3 performs addition processing in accordance with a control signal from the control circuit 6 in delay time/weighting coefficient optimization processing (to be described later).

The harmonic detection unit 4 performs processing associated with the phase-in version method, and comprises a waveform memory 17, adder-subtracter 18, and filter circuit 19. The waveform memory 17 temporarily stores echo signals obtained by the first transmission/reception in a predetermined direction. The adder-subtracter 18 adds or subtracts echo signals obtained by second to nth ($n$ is a natural number of two or more; n=4 in this case) transmission/reception in the predetermined direction and the echo signals stored in the waveform memory 17. The filter circuit 19 is a filter which reduces fundamental components which cannot be erased by the phase-in version method due to the movement of an organ and the movement of the body.

The signal processing unit 5 comprises an envelope detector 20, logarithmic transformer 21, and persistence transformer 22. The envelope detector 20 performs envelope detection computation for an input digital signal to detect its envelope. The logarithmic transformer 21 comprises a lookup table which logarithmically transforms an input value and outputs the resultant data. The logarithmic transformer 21 logarithmically transforms the amplitude of an echo signal to relatively enhance a weak signal. The persistence transformer temporarily stores scanning lines corresponding to several frames, and performs processing of averaging luminance changes.

The image display unit 8 comprises a display image memory 23 and a conversion circuit 24. The display image memory 23 combines image data supplied from the signal processing unit 5 and accessory data such as characters and numerals associated with the image data, and temporarily stores the resultant data. The display image memory 23 temporarily stores image data obtained by combining a normal mode image and a puncture mode image in a predetermined form. The stored image data and accessory data are subjected to D/A conversion and TV format conversion in the conversion circuit 24, and the resultant image is displayed on the monitor 25.

The control circuit 6 reads out transmission/reception conditions and a dedicated program stored in the storage unit 30 on the basis of instructions of mode selection, transmission start/end, and the like input from the input unit 7, and statically or dynamically controls each unit and the overall system in accordance with them. In this embodiment, in particular, the control circuit 6 reads out a dedicated program for implementing the delay time/weighting coefficient optimization function (to be described later) from the storage unit 30, loads the program in a predetermined memory, and executes control on each unit in accordance with the program.

(Ultrasonic Transmission/Reception Condition (Delay Time/Weighting Coefficient) Optimization Function)

The delay time/weighting coefficient optimization function of the ultrasonic diagnostic apparatus 1 will be described next. This function is used to accurately grasp the spatial position of each ultrasonic transducer for each probe and execute ultrasonic transmission/reception by using the delay time/weighting coefficient calculated on the basis of the spatial position of each ultrasonic transducer, thereby realizing a suitable acoustic field in consideration of the influence of each edge transducer gap and the acoustic characteristics of each edge transducer.

Note that the delay time optimized by this function is a delay pattern for beam forming (to be executed at the time of transmission or reception). In addition, the weighting coefficient optimized by this function indicates the weighting coefficient of an aperture function used in echo signal addition processing.

In addition, this optimization function can be implemented by installing software programs for executing processing associated with this function in an existing ultrasonic diagnostic apparatus or a computer such as a workstation and loading the programs in a memory as well as being implemented by a hardware arrangement. In this case, the programs which can cause the computer to execute the corresponding techniques can be distributed by being stored in recording media such as magnetic disks (floppy (registered trademark) disks, hard disks, and the like), optical disks (CD-ROMs, DVDs, and the like), and semiconductor memories.

FIG. 2 is a view for explaining a conventional delay time/weighting coefficient calculation technique. As shown in FIG. 2, in the conventional technique, an ultrasonic transducer array is assumed to have an ideal structure without any edge transducer gap due to the connection layers which connect the ultrasonic transducer blocks to each other, a coordinate axis is set with, for example, a reference position O being an origin, and a spatial position $x(n)$ ($\underline{n}$ is a transducer number) of each element is defined on the basis of the width of each element, an array pitch, and the like. In addition, a delay time and a weighting coefficient are determined by predetermined formulas $T(x(n))$ and $W(x(n))$ defined with reference to the above ideal structure.

Figure 3:
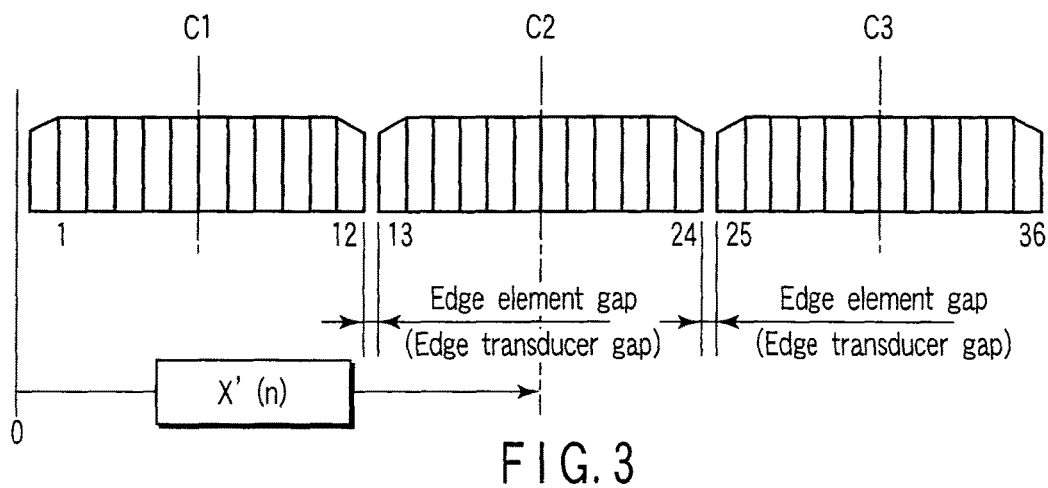
FIG. 3 is a view for explaining a delay time/weighting coefficient calculation technique associated with a delay time/weighting coefficient optimization function according to this embodiment.

In an actual ultrasonic transducer array, however, there are edge transducer gaps due to the connection layers which connect the ultrasonic transducer blocks to each other, and hence the positions of the respective elements are influenced by the edge transducer gaps (see FIG. 3). For this reason, the spatial position $x(n)$ of each element which is defined by the conventional technique is not accurate, and hence the delay time and weighting coefficient which are determined by using the position $x(n)$ and predetermined formulas $T(x(n))$ and $W(x(n))$ also contain errors due to the edge transducer gaps and become factors that produce an acoustic field which degrades a low deflection angle accuracy and includes many sidelobes.

This delay time/weighting coefficient optimization function serves to accurately grasp the spatial position of each ultrasonic transducer for each probe and execute ultrasonic transmission/reception by using the delay time and weighting coefficient for each transducer calculated on the basis of the spatial position of each transducer.

FIG. 3 is a view for explaining a delay time/weighting coefficient calculation technique according to this function. According to this function, for example, a coordinate axis with the reference position O being an origin is set, and a spatial position $x'(n)$ of each element is defined in consideration of the edge transducer gaps. In addition, a delay time and a weighting coefficient are determined by predetermined formulas $T(x'(n))$ and $W(x'(n))$ defined in consideration of the edge transducer gaps.

First of all, the reference positions (central positions C1, C2, and C3 in the example shown in FIG. 3) of ultrasonic blocks BL1, BL2, and BL3 are measured. In each ultrasonic block, the spatial position $x'(n)$ of each ultrasonic transducer is determined in accordance with the distance from each central position. At this time, since the central positions C1, C2, and C3 of the respective ultrasonic blocks are measured in consideration of the thicknesses of connection layers D1 and D2, the spatial position $x'(n)$ of each ultrasonic transducer can be accurately grasped.

Figures 4A, 4B:
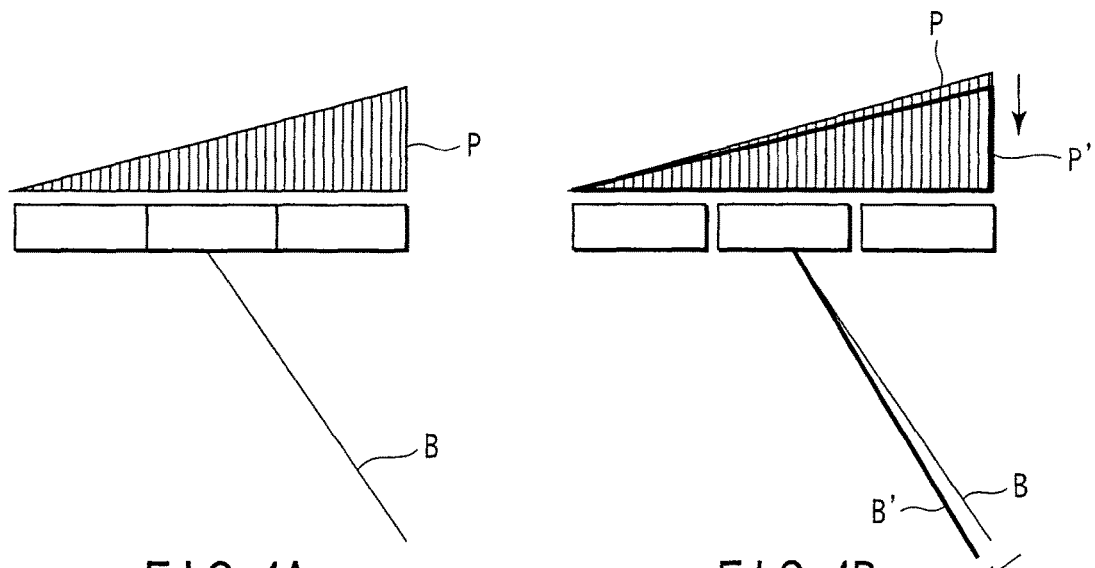
FIG. 4A is a view for explaining an example of the effect obtained by this delay time/weighting coefficient optimization function.
FIG. 4B is a view for explaining an example of the effect obtained by this delay time/weighting coefficient optimization function.

In addition, a delay time and a weighting coefficient are accurately defined on the basis of the spatial position of each ultrasonic transducer. Take a transmission/reception delay time for example, if a conventional delay pattern P with no consideration given to edge transducer gaps and a beam B based on this pattern are those shown in FIG. 4A, this function can correct them into a deflection delay pattern P' and a beam B' based on this pattern as shown in FIG. 4B. This makes it possible to eliminate errors due to the edge transducer gaps and realize a suitable acoustic field which improves the deflection angle accuracy and includes little sidelobes.

In this embodiment, for the sake of descriptive convenience, a delay time and a weighting coefficient are defined by predetermined formulas $T(x(n))$, $W(x(n))$, $T(x',(n))$, and $W(x'(n))$. However, the present invention is not limited to this, and the technical idea of the present invention can be applied to any arrangement as long as each ultrasonic transducer is identified on the basis of an accurate spatial position in consideration of edge transducer gaps, and a delay time and a weighting coefficient are defined for each identified element. Therefore, a delay time and a weighting coefficient for each element may be obtained by using a table which associates the spatial position of each transducer, obtained in consideration of edge transducer gaps, with a delay time and a weighting coefficient.

In addition, the reference position of each ultrasonic block BLn ($\underline{n}$ is a natural number) is not limited to a central position Cn of each block. That is, the reference position may be any position as long as the position of each element of each ultrasonic block can be determined in consideration of the thickness of a connection layer Dn.

Figure 5:
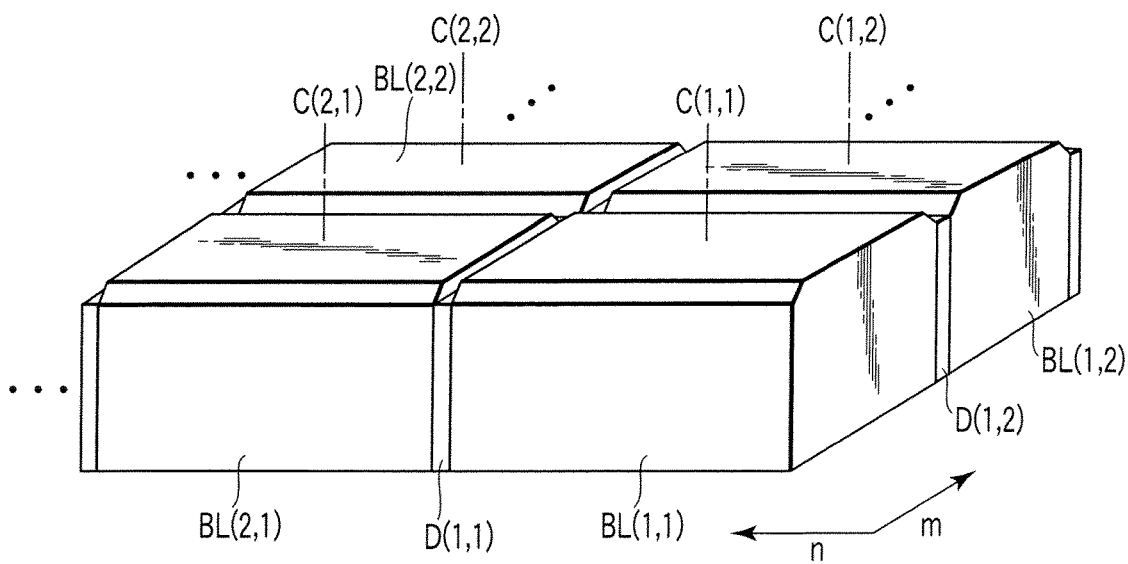
FIG. 5 is a perspective view for explaining an example in which ultrasonic transducer blocks BL(n, m) are connected and arranged in the form of a two-dimensional matrix through connection layers Dn and Dm.

This embodiment has exemplified the case wherein the ultrasonic blocks BLn are one-dimensionally (in the array direction) connected through the connection layers Dn. However, the present invention is not limited to this, and the technique of this embodiment can also be applied to a case wherein ultrasonic blocks BL(n, m) ($\underline{n}$ and $\underline{m}$ are both natural numbers) are two-dimensional connected to each other through connection layers Dn and Dm, as shown in, for example, FIG. 5. In this case, central positions C(1, 1), . . . , C(n, m) of ultrasonic blocks BL(1, 1), . . . , BL(n, m) are measured. In each ultrasonic block, then, a spatial position $x'(n, m)$ of each ultrasonic transducer is determined in accordance with the distance from each central position. At this time, since the thicknesses of the connection layers Dn and Dm are taken into consideration in the measurement of the central position C(n, m) of each ultrasonic block, the spatial position $x'(n, m)$ of each ultrasonic transducer can be accurately grasped.

(Measurement of Position of Each Ultrasonic Transducer)

Calculation of delay times and weighting coefficients with consideration given to the above edge transducer gaps is executed according to a predetermined formula, rule, or the like on the basis of the spatial positions of the respective ultrasonic transducers. The position of each ultrasonic transducer which is used in this case can be measured by, for example, one of the methods according to the first to third embodiments to be described below.

First Embodiment

Before acoustic lenses and the like are bonded, an array shape is measured by using a microscope or the like, and offset values and variations of ultrasonic transducer block intervals are obtained and calculated as statistics for each production lot of ultrasonic transducer blocks. Predetermined correction is then performed by using software for the system on the basis of the obtained offset values, and the unified spatial position of each ultrasonic transducer is obtained for each production lot. According to this technique, the spatial position of each ultrasonic transducer can be acquired relatively easily in consideration of the influences of edge transducer gaps.

Second Embodiment

An array shape (ultrasonic transducer block interval or the like) is measured for each ultrasonic probe before a manufactured lens is bonded. The measured value is input to a predetermined correction table incorporated in advance in an ultrasonic diagnostic apparatus 1, and correction is performed for each probe by using each piece of probe information. This technique can acquire the spatial position of each ultrasonic transducer in consideration of edge transducer gaps more accurately than the technique according to the first embodiment and more easily than the technique according to the third embodiment.

Third Embodiment

Each manufactured probe is placed in a water bath, and an acoustic field is measured. Parameters are operated and optimized until deflection angles and sidelobes fall within specified values, and the optimal values are input to a predetermined correction table incorporated in the apparatus in advance, thereby performing correction for each probe. For example, a sidelobe originating from an adhesive layer between ultrasonic transducer blocks has a shape with a certain tendency. The influence of an edge transducer gap can be corrected by inputting optimal values so as to reduce such a tendency. This technique can acquire the spatial position of each ultrasonic transducer more accurately than the techniques according to the first and second embodiments.

(Apodization)

In an ultrasonic probe 10 having an arrangement in which ultrasonic blocks BLn are bonded to each other through adhesive layers Dn, a problem arises in terms of the acoustic characteristics of edge transducers bonded to the adhesive layers. In this ultrasonic diagnostic apparatus, a weighting coefficient for attenuating an echo signal from each edge transducer is set, and addition processing is performed by using it to reduce a sidelobe due to the acoustic characteristics of each edge transducer (apodization).

In addition, apodization may be executed for a signal at the time of transmission as well as a signal at the time of reception. That is, a transmission voltage is set with a weight that reduces transmission ultrasonic waves and is applied to each edge transducer. This makes it possible to transmit a beam with a reduced sidelobe originating from the acoustic characteristics of each edge transducer.

(Operation)

Ultrasonic transmission/reception based on the delay time/weighting coefficient optimization function of an ultrasonic diagnostic apparatus 1 will be described next.

Figure 6:
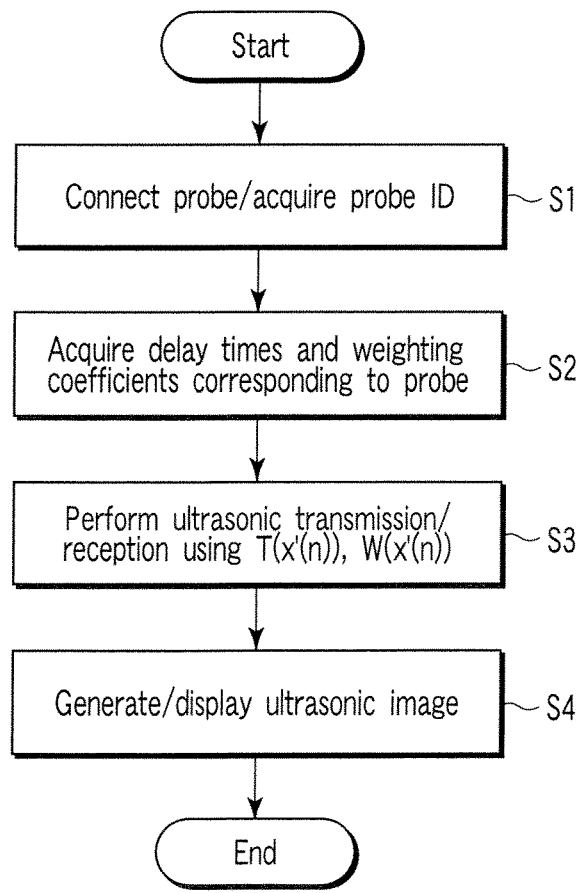
FIG. 6 is a flowchart showing the flow of each processing executed in ultrasonic transmission/reception based on the delay time/weighting coefficient optimization function.

FIG. 6 is a flowchart showing the flow of each processing executed in ultrasonic transmission/reception based on the delay time/weighting coefficient optimization function. As shown in FIG. 6, first of all, when the ultrasonic probe 10 used for imaging is connected to an apparatus body 50, a control circuit 6 recognizes the ID of the connected ultrasonic probe 10 (step S1), and acquires a delay time and weighting coefficient for each ultrasonic transducer of the ultrasonic probe (i.e., T(x'(n)) and W(x'(n)) set in consideration of each edge transducer gap) from a storage unit 30 (step S2). In addition, a weighting coefficient is determined for each edge transducer to reduce a sidelobe originating from its acoustic characteristics.

Note that this delay time and weighting coefficient are calculated in advance by using the spatial position information and delay time/weighting coefficient acquisition information of each ultrasonic transducer of the ultrasonic probe which are stored in the storage unit 30. However, the present invention is not limited to this. For example, every time an ultrasonic probe is connected to the apparatus body 50, a delay time and a weighting coefficient may be calculated by using the spatial position information and delay time/weighting coefficient information of each ultrasonic transducer of the ultrasonic probe which are stored in the storage unit 30.

Ultrasonic transmission/reception is performed on the basis of the acquired delay time/weighting coefficient information (step S3). An ultrasonic image is then generated on the basis of acquired echo signals, and is displayed in a predetermined form (step S4).

According to the above arrangement, the following effects can be obtained.

According to this ultrasonic diagnostic apparatus, the position of each ultrasonic transducer is accurately specified in consideration of each edge transducer gap, and a delay time/weighting coefficient for each transducer is determined in ultrasonic transmission/reception on the basis of the specified position. For example, a reference position of each ultrasonic block is measured, and a spatial position x'(n) of each ultrasonic transducer is determined in accordance with the distance from each reference position. Since a delay time and a weighting coefficient are determined in accordance with the position of each ultrasonic transducer, accurate delay times and weighting coefficients can be determined in consideration of the thickness of each adhesive layer as compared with the prior art in which delay times and weighting coefficients are determined without any consideration to edge transducer gaps. That is, delay times are corrected by times corresponding to the distances from the edge transducer gaps. In addition, for example, a weighting coefficient matching the characteristics of each transducer can be set by specifying each edge transducer on the basis of accurate spatial positions and selecting a weighting coefficient corresponding to a deterioration in the sensitivity of each edge transducer. This makes it possible to realize a suitable acoustic field which realizes high deflection angle accuracy and can reduce sidelobes and the like as compared with the prior art.

Figure 7:
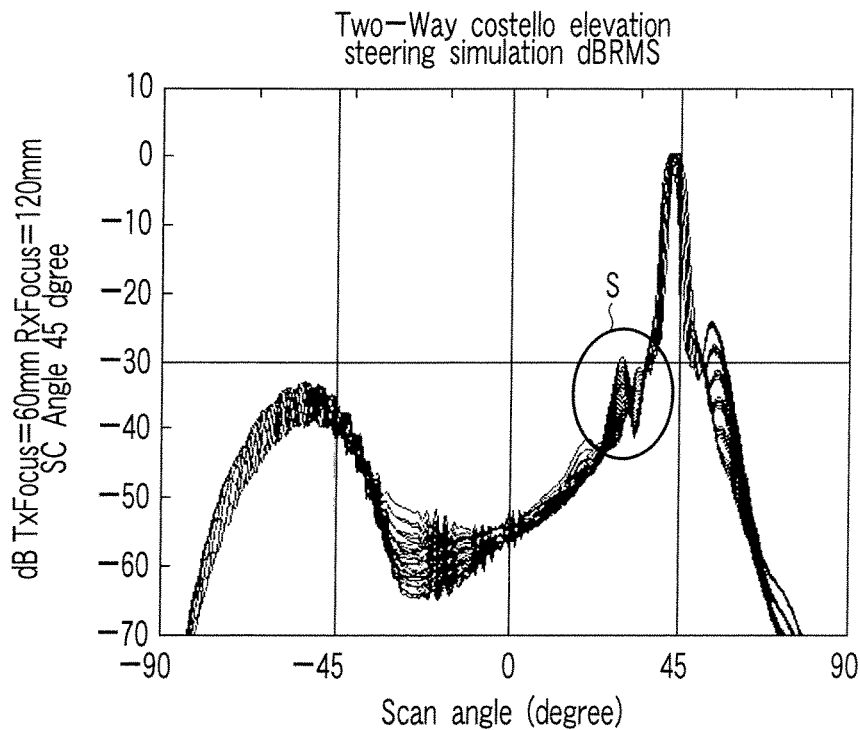
FIG. 7 is a graph showing the spectrum distribution of echo signals obtained by ultrasonic transmission/reception using delay times and weighting coefficients according to the prior art (i.e., without any consideration to edge transducer gaps)
Figure 8:
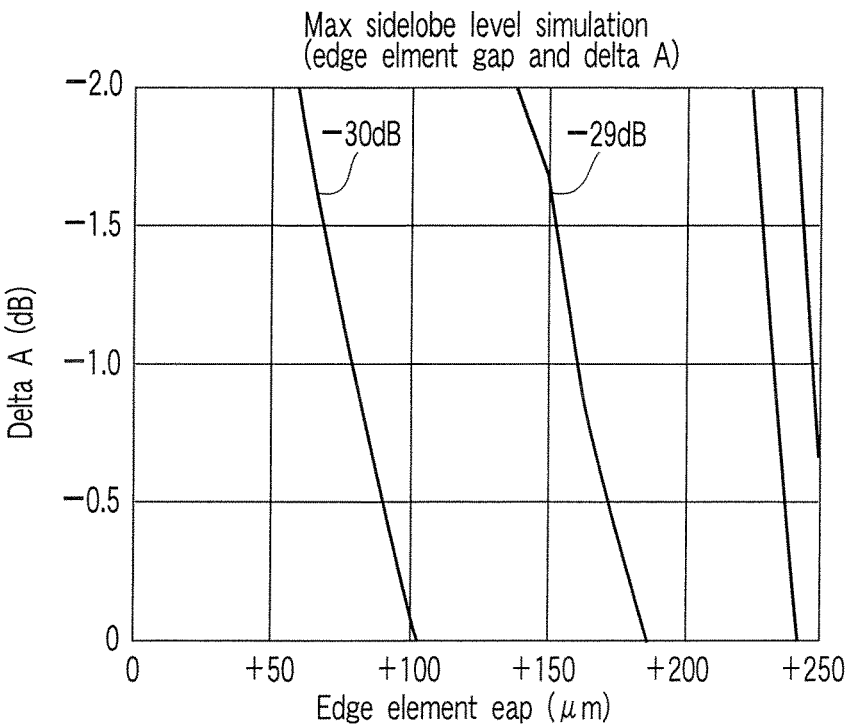
FIG. 8 is a graph showing the distribution of sidelobes which appear in ultrasonic transmission/reception using delay times and weighting coefficients according to the prior art.
Figure 11:
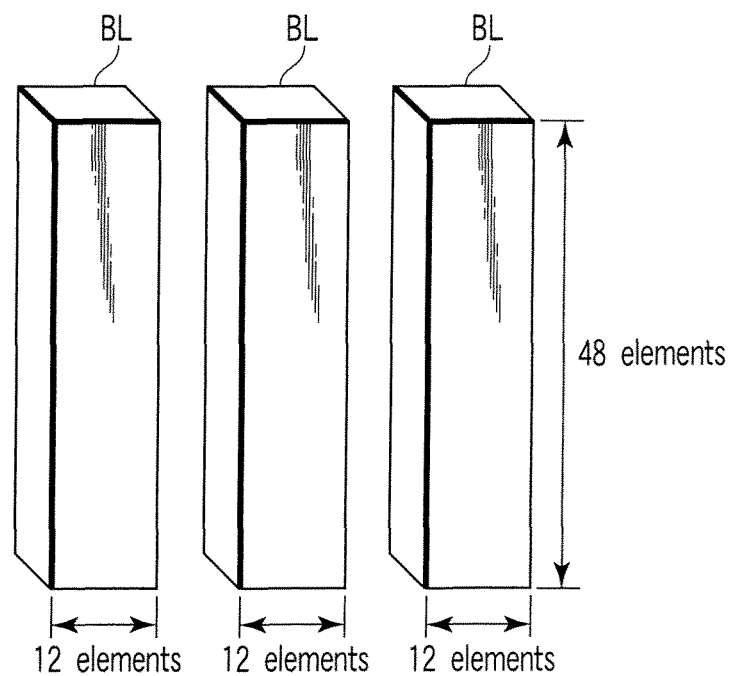
FIG. 11 is a view for explaining the ultrasonic transducer array of an ultrasonic probe.
Figure 12:
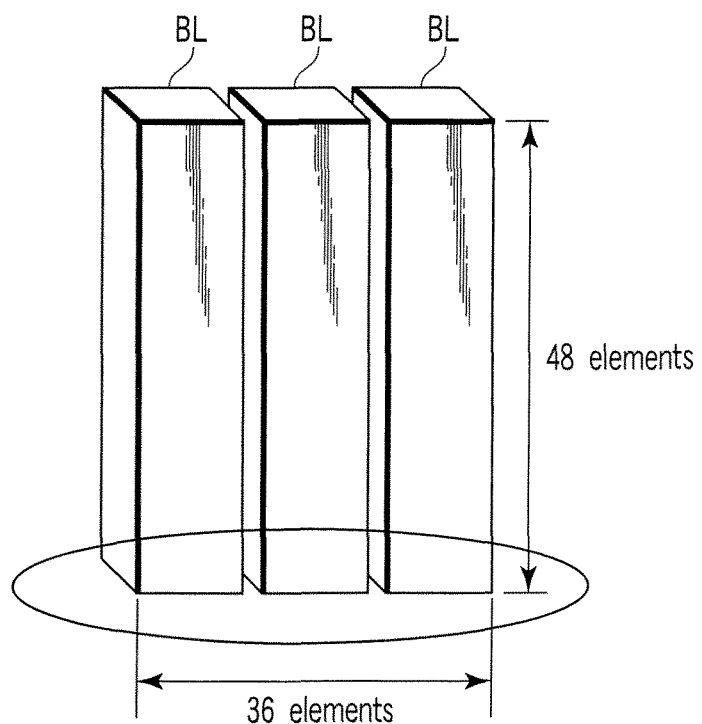
FIG. 12 is a view for explaining the ultrasonic transducer array of the ultrasonic probe.
Figure 13:
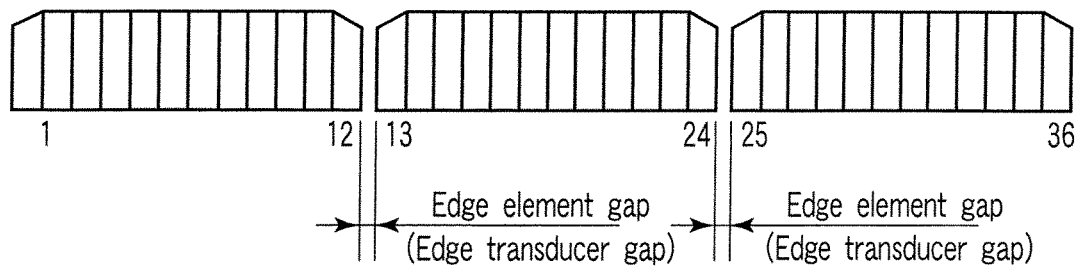
FIG. 13 is a view for explaining the ultrasonic transducer array of the ultrasonic probe.
Figure 14:
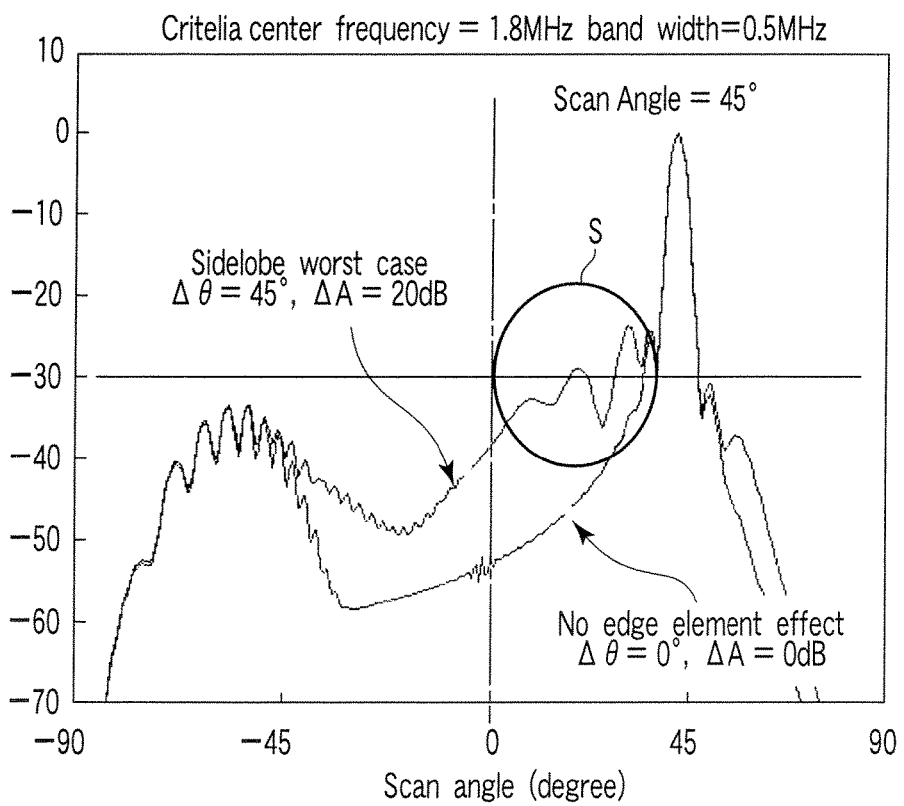
FIG. 14 is a graph showing the spectrum distribution of transmission ultrasonic waves to explain problems in a conventional ultrasonic diagnostic apparatus.

FIG. 7 is a graph showing the spectrum distribution of echo signals obtained by ultrasonic transmission/reception using delay times and weighting coefficients according to the prior art (i.e., those determined by a technique without any consideration to edge transducer gaps). FIG. 8 is a graph showing the distribution of sidelobes which appear in ultrasonic transmission/reception using delay times and weighting coefficient according to the prior art.

FIG. 9 is a graph showing the spectrum distribution of echo signals obtained by ultrasonic transmission/reception using delay times and weighting coefficients determined by this delay time/weighting coefficient optimization function. FIG. 10 is a graph showing the distribution of sidelobes which appear in ultrasonic transmission/reception using delay times and weighting coefficient determined by the delay time/weighting coefficient optimization function.

A comparison between FIGS. 7 and 9 reveals that the size of a sidelobe S' is smaller than that of a sidelobe S. In addition, a comparison between FIGS. 8 and 10 reveals that in ultrasonic transmission/reception executed in this apparatus, the occurrence of sidelobes is more suppressed, and the resolution improves. This technique has the effect of solving the problem that the main lobe is located inside more than actually due to the shadows of the edge transducer gaps, in addition to the sidelobe reducing effect.

In addition, according to this embodiment, sidelobes originating from the acoustic characteristics of the edge transducers bonded to the adhesive layers are reduced by executing apodization associated with the edge transducers at least at the time of transmission or reception. As a consequence, ideal beam forming can be realized at the time of transmission and at the time of reception.

Furthermore, according to this embodiment, a program which implements this delay time/weighting coefficient optimization function and the spatial position of each ultrasonic transducer obtained in consideration of each edge transducer gap are installed in an existing apparatus, and the apparatus is activated to implement the delay time/weighting coefficient optimization function. Therefore, this function can be implemented at a relatively low cost and with ease.

The present invention is not limited to the above embodiment, and can be embodied in the execution stage by modifying constituent elements within the spirit and scope of the invention. For example, the following are specific modifications.

(1) The above embodiment has exemplified delay time/weighting coefficient optimization in the ultrasonic diagnostic apparatus. However, the technical idea of the present invention can be applied to any apparatus which performs at least ultrasonic transmission or ultrasonic reception. Therefore, the present invention is not limited to an ultrasonic diagnostic apparatus, and can be applied to an ultrasonic medical treatment apparatus, an ultrasonic examination apparatus, and the like.

(2) In the above embodiment, for the sake of concreteness, a two-dimensional ultrasonic probe having a plurality of ultrasonic transducers arranged in the form of a matrix has been exemplified. However, the present invention is not limited to this, and the technical idea of the present invention can be applied to any ultrasonic probe having a structure in which ultrasonic transducer blocks are connected to each other through connection layers. Therefore, the present invention can be applied to a one-dimensional array probe, a 1.5-dimensional array probe, and the like as long as they have the above structure.

In addition, various inventions can be formed by proper combinations of a plurality of constituent elements disclosed in the above embodiments. For example, several constituent elements may be omitted from all the constituent elements disclosed in the above embodiments. Furthermore, constituent elements in the different embodiments may be properly combined.

What is claimed is:

1. An ultrasonic diagnostic apparatus comprising:
an ultrasonic probe including a plurality of ultrasonic transducer blocks which are arranged along one predetermined direction and respectively include a plurality of ultrasonic transducers, and including adhesive layers arranged between the plurality of ultrasonic transducer blocks and that bond the plurality of ultrasonic transducer blocks to each other;
a transmission/reception processor configured to drive at least one of the transducers of the ultrasonic probe and perform beam-forming along a receiving direction by using echo signals received through a plurality of ultrasonic transducers in at least two of the ultrasonic transducer blocks, which plurality of ultrasonic transducers include an ultrasonic transducer adjacent to the at least one adhesive layer between the at least two ultrasonic transducer blocks;
a setting processor configured to set weighting coefficients and delay times for echo signals as a transmission/reception condition; and
a control processor configured to control the setting processor such that a weighting coefficient for an echo signal received through the ultrasonic transducer adjacent to the at least one adhesive layer is smaller than weighting coefficients for echo signals received through the ultrasonic transducers other than the ultrasonic transducer adjacent to the adhesive layer, and control the transmission/reception processor such that the beam-forming is performed by using weighting coefficients and delay times for the echo signals received through the plurality of ultrasonic transducers including the ultrasonic transducer adjacent to the at least one adhesive layer between the at least two ultrasonic transducer blocks.

2. An apparatus according to claim 1, wherein the control processor determines at least one of a delay time for said each ultrasonic transducer in ultrasonic transmission, a delay time for said each ultrasonic transducer in ultrasonic reception, and the weighting coefficient for said echo signal which is used in addition processing of a received ultrasonic wave in accordance with a position of said each ultrasonic transducer block.

3. An apparatus according to claim 1, wherein the control processor determines the delay times in ultrasonic reception and the weighting coefficients by predetermined calculation using positions of the plurality of ultrasonic transducers including the ultrasonic transducer adjacent to the at least one adhesive layer between the at least two ultrasonic transducer blocks.

4. An apparatus according to claim 1, wherein the control processor determines the delay times in ultrasonic reception and the weighting coefficient by using a table which associates a position of said each ultrasonic transducer with each delay time and each weighting coefficient.

5. An apparatus according to claim 1, wherein the ultrasonic probe comprises a two dimensional array probe including ultrasonic transducers arranged in the form of a matrix or a 1.5 dimensional array probe.

6. An apparatus according to claim 1, wherein said plurality of ultrasonic transducer blocks are arranged in an array form along a predetermined direction, and
said plurality of adhesive layers bond the ultrasonic transducers adjacent to each other in the predetermined direction.

7. An apparatus according to claim 1, wherein
said plurality of ultrasonic transducer blocks are arranged in the form of a matrix along a first direction and a second direction, and
said plurality of adhesive layers bond the ultrasonic transducers adjacent to each other along the first direction and the ultrasonic transducers adjacent to each other along the second direction.

8. An apparatus according to claim 1, wherein the control processor determines the transmission/reception condition such that a contribution of the ultrasonic transducer bonded to the adhesive layer to a transmission ultrasonic wave and a reception ultrasonic wave is smaller than a contribution of the ultrasonic transducer which is not bonded to the adhesive layer to a transmission ultrasonic wave and a reception ultrasonic wave.

9. An apparatus according to claim 1, wherein the control processor is configured to control the transmission/reception processor such that the beam-forming is performed by adding the echo signals using the delay times after weighting the echo signals using the weighting coefficients.

10. An ultrasonic transmission/reception condition optimization method using an ultrasonic probe including a plurality of ultrasonic transducer blocks which are arranged along one predetermined direction and respectively include a plurality of ultrasonic transducers, and including adhesive layers arranged between the plurality of ultrasonic transducer blocks and that bond the plurality of ultrasonic transducer blocks to each other, comprising:

driving at least one of the ultrasonic transducers of the ultrasonic probe and performing beam-forming along a receiving direction by using echo signals received through a plurality of ultrasonic transducers in at least two of the ultrasonic transducer blocks, which plurality of ultrasonic transducers include an ultrasonic transducer adjacent to the at least one adhesive layer between the at least two ultrasonic transducer blocks;

setting weighting coefficients and delay times for echo signals as a transmission reception condition;

wherein a weighting coefficient for an echo signal received through the ultrasonic transducer adjacent to the at least one adhesive layer is smaller than weighting coefficients for echo signals received through the ultrasonic transducers other than the ultrasonic transducer adjacent to the adhesive layer; and further comprising performing the beam-forming by using weighting coefficients and delay times for the echo signals received through the plurality of ultrasonic transducers including the ultrasonic transducer adjacent to the at least one adhesive layer between the at least two ultrasonic transducer blocks.

11. A method according to claim 10, wherein the transmission/reception condition includes at least one of a delay time for said each ultrasonic transducer in ultrasonic transmission, a delay time for said each ultrasonic transducer in ultrasonic reception, and the weighting coefficient for said each echo signal which is used in addition processing of received ultrasonic waves.

12. A method according to claim 10, wherein in determining the transmission/reception condition, the delay times in ultrasonic reception and the weighting coefficients are determined by predetermined calculation using positions of the plurality of ultrasonic transducers including the ultrasonic transducer adjacent to the at least one adhesive layer between the at least two ultrasonic transducer blocks.

13. A method according to claim 10, wherein in determining the transmission/reception condition, the delay times in ultrasonic reception and the weighting coefficients are determined by using a table which associates a position of said each ultrasonic transducer with each delay time and each weighting coefficient.

14. A method according to claim 10, wherein the ultrasonic probe comprises a two dimensional array probe including ultrasonic transducers arranged in the form of a matrix or a 1.5 dimensional array probe.

15. A method according to claim 10, wherein said plurality of ultrasonic transducer blocks are arranged in an array form along a predetermined direction, and said plurality of adhesive layers bond the ultrasonic transducers adjacent to each other in the predetermined direction.

16. A method according to claim 10, wherein said plurality of ultrasonic transducer blocks are arranged in the form of matrix along a first direction and a second direction, and said plurality of adhesive layers bond the ultrasonic transducers adjacent to each other along the first direction and the ultrasonic transducers adjacent to each other along the second direction.

17. A method according to claim 10, wherein the transmission/reception condition is determined such that a contribution of the ultrasonic transducer bonded to the adhesive layer to a transmission ultrasonic wave and a reception ultrasonic wave is smaller than a contribution of the ultrasonic transducer which is not bonded to the adhesive layer to a transmission ultrasonic wave and a reception ultrasonic wave.

* * * * *